United States Patent
Jung et al.

(10) Patent No.: US 9,266,560 B2
(45) Date of Patent: Feb. 23, 2016

(54) ELECTRIC ACTUATOR-INTEGRATED ELECTRIC POWER STEERING SYSTEM AND METHOD OF CONTROLLING THE SAME

(71) Applicant: Hyundai Motor Company, Seoul (KR)

(72) Inventors: Dae Suk Jung, Hadong-gun (KR); Soo Bo Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/301,059

(22) Filed: Jun. 10, 2014

(65) Prior Publication Data
US 2015/0019078 A1    Jan. 15, 2015

(30) Foreign Application Priority Data
Jul. 15, 2013 (KR) .................. 10-2013-0082871

(51) Int. Cl.
| | |
|---|---|
| B62D 5/06 | (2006.01) |
| B60H 1/32 | (2006.01) |
| B62D 5/065 | (2006.01) |
| F04B 23/04 | (2006.01) |
| F04B 49/02 | (2006.01) |

(52) U.S. Cl.
CPC .............. B62D 5/064 (2013.01); B60H 1/3208 (2013.01); B60H 1/3222 (2013.01); B62D 5/065 (2013.01); F04B 23/04 (2013.01); F04B 49/02 (2013.01); B60H 2001/3292 (2013.01)

(58) Field of Classification Search
CPC .............. B60H 1/3222; B60H 1/3208; B60H 2001/3292; F04B 49/02; F04B 23/04; B62D 5/065; B62D 5/064

USPC ......... 701/41; 417/213, 319, 53, 423.2, 423.7
See application file for complete search history.

(56) References Cited

U.S. PATENT DOCUMENTS

| | | | |
|---|---|---|---|
| 2002/0033059 A1* | 3/2002 | Pels et al. .......................... | 74/329 |
| 2003/0161745 A1* | 8/2003 | Kern .......................... | 417/423.7 |

FOREIGN PATENT DOCUMENTS

| | | | |
|---|---|---|---|
| JP | 10-30449 A | | 2/1998 |
| KR | 20070042432 A | * | 10/2005 |
| KR | 10-2007-0042432 A | | 4/2007 |
| KR | 10-2012-0062266 A | | 6/2012 |
| KR | 20120062266 A | * | 6/2012 |
| KR | 10-2013-0013282 A | | 2/2013 |
| KR | 10-2013-0033169 A | | 4/2013 |
| KR | 10-2013-0102947 A | | 9/2013 |
| WO | WO 02/070291 A1 | | 9/2002 |

* cited by examiner

*Primary Examiner* — Marthe Marc-Coleman
(74) *Attorney, Agent, or Firm* — Morgan, Lewis & Bockius LLP

(57) ABSTRACT

An electric actuator-integrated electric power steering system may include an integrated motor which provides rotational force, a hydraulic pump connected to one end of the integrated motor and supplied with the rotational force from the integrated motor to pump working fluid that is used to transmit steering force, and an electric actuator connected to the other end of the integrated motor via a power controlling means. The electric actuator may operate when the rotational force is transmitted to the electric actuator and whether the rotational force from the integrated motor is transmitted to or cut off from the electric actuator may depend on an operation of the power controlling means.

14 Claims, 4 Drawing Sheets

ELECTRIC ACTUATOR-INTEGRATED ELECTRIC POWER STEERING SYSTEM AND METHOD OF CONTROLLING THE SAME

CROSS REFERENCE TO RELATED APPLICATION

The present application claims priority of Korean Patent Application 10-2013-0082871 filed on Jul. 15, 2013, the entire contents of which application are incorporated herein for all purposes by this reference.

BACKGROUND OF INVENTION

1. Field of Invention

The present invention relates, in general, to an electric actuator-integrated electric power steering system and, more particularly, to an electric actuator-integrated electric power steering system and a method of controlling the same, in which power sources and control parts of an electric-hydraulic power steering system and a compressor are integrated together to reduce cost and weight.

2. Description of Related Art

Generally, a vehicle actuates a compressor using a driving force from an engine in order to realize an air conditioning function.

In the case of environmental vehicles such as electric vehicles (EVs), hybrid electric vehicles (HEVs) and fuel cell electric vehicles (FCEVs), EVs and FCEVs do not have an engine and HEVs frequently run using a driving force from a motor with an engine stopped. Therefore, instead of a mechanical compressor that uses the driving force from the engine, an electric compressor using an electric motor is required in order to realize the air conditioning function.

In the meantime, the application of electric power steering systems using an electric motor without using power from an engine is also increasing in order to cope with the demands of the above-mentioned environmental vehicles as well as stricter environmental regulations (fuel efficiency, $CO_2$ emission, or the like).

In particular, electronic hydraulic power steering (EHPS) can produce high power while realizing the same sensation of steering as that of hydraulic power steering since a pump is actuated using an electric motor. Due to this advantage, EHPS systems are being mass-produced at present.

However, when an electric compressor and an electric power steering system are concurrently disposed, motors, controllers and the like are required to be mounted for respective systems. An increase in the number of parts is significantly disadvantageous in terms of a cost and a weight.

In the related art, Korean Patent Application Publication No. 10-2013-0013282, titled "APPARATUS IN WHICH ELECTRIC POWER STEERING AND COMPRESSOR ARE INTEGRATED," was disclosed.

However, this approach also used two clutches, and thus a reduction in the number of parts was not satisfactory.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made keeping in mind the above problems occurring in the related art and/or other problems, and the present invention is intended to provide an electric actuator-integrated electric power steering system and a method of controlling the same, in which power sources and control parts of an electric-hydraulic power steering system and a compressor are integrated together to reduce cost and weight.

Various aspects of the present invention provide for an electric actuator-integrated electric power steering system that includes: an integrated motor which provides rotational force; and a hydraulic pump connected to one end of the integrated motor. The hydraulic pump is supplied with the rotational force from the integrated motor so as to pump working fluid that is used to transmit steering force. The electric actuator-integrated electric power steering system also includes an electric actuator connected to the other end of the integrated motor via a power controlling means. The electric actuator operates when the rotational force is transmitted to the electric actuator and whether the rotational force from the integrated motor is transmitted to or cut off from the electric actuator depends on an operation of the power controlling means.

According to one aspect of the present invention, the hydraulic pump may be connected to the integrated motor such that the rotational force from the integrated motor is continuously supplied to the hydraulic pump. The power controlling means may include an electromagnetic clutch which turns on/off depending on whether or not a current is induced. The electric actuator may include an electric compressor which allows an air conditioner to operate.

The electric actuator-integrated electric power steering system may further include a control valve disposed on a path along which the working fluid is supplied to a steering gear box. The control valve controls the flow rate of the working fluid. The electric actuator-integrated electric power steering system may further include a control part electrically connected to the motor and the control valve. The control part receives an operation signal which allows the electric actuator to operate, and variably controls the motor and the control valve while causing the power controlling means to operate or not depending on the operation of the electric actuator.

The control part may determine the number of revolutions of the motor depending on the load of operation of the electric actuator when the power controlling means operates, and controls the steering force by adjusting the flow rate of the working fluid through the control valve. The control part may control the steering force by adjusting the flow rate of the working fluid by controlling the number of revolutions of the motor when the power controlling means does not operate.

According to another aspect of the present invention, provided is an electric actuator-integrated electric power steering system that includes: an integrated motor which provides rotational force; and a hydraulic pump connected to one end of the integrated motor. The hydraulic pump is supplied with the rotational force from the integrated motor so as to pump working fluid that is used to transmit steering force. The electric actuator-integrated electric power steering system also includes a compressor connected to the other end of the integrated motor via a power controlling means. The compressor operates when the rotational force is transmitted to the compressor, and whether the rotational force from the integrated motor is transmitted to or cut off from the compressor depends on an operation of the power controlling means.

According to yet another aspect of the present invention, there is provided a method of controlling the electric actuator-integrated electric power steering system. The method includes the following steps of: detecting whether or not there is an operation signal which allows an air conditioner to operate; operating the hydraulic pump and either one of the electric actuator and the compressor in an integrated fashion using the rotational force from the integrated motor as the power controlling means operates when the air conditioner is operated; and operating the hydraulic pump alone using the rotational force from the integrated motor as the power controlling means does not operate when the air conditioner is not operated.

According to an aspect of the present invention, the step of operating the hydraulic pump with the electric actuator or with the compressor in the integrated fashion may include determining the number of revolutions of the motor depending on the load of operation of the electric actuator or of the compressor, wherein the steering force is controlled by adjusting the flow rate of the working fluid through a control valve.

The step of operating the hydraulic pump alone may include controlling the steering force by adjusting the flow rate of the working fluid by controlling the number of revolutions of the motor.

According to various aspects of the present invention, the hydraulic pump for the power steering system and the compressor which drives the air conditioner are operated in an integrated fashion using rotational force provided from one integrated motor and are controlled using one control part in an integrated fashion. This can consequently reduce the number of parts required for operating the electric-hydraulic power steering system and the electric compressor in an integrated fashion, thereby reducing the cost and weight of a vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
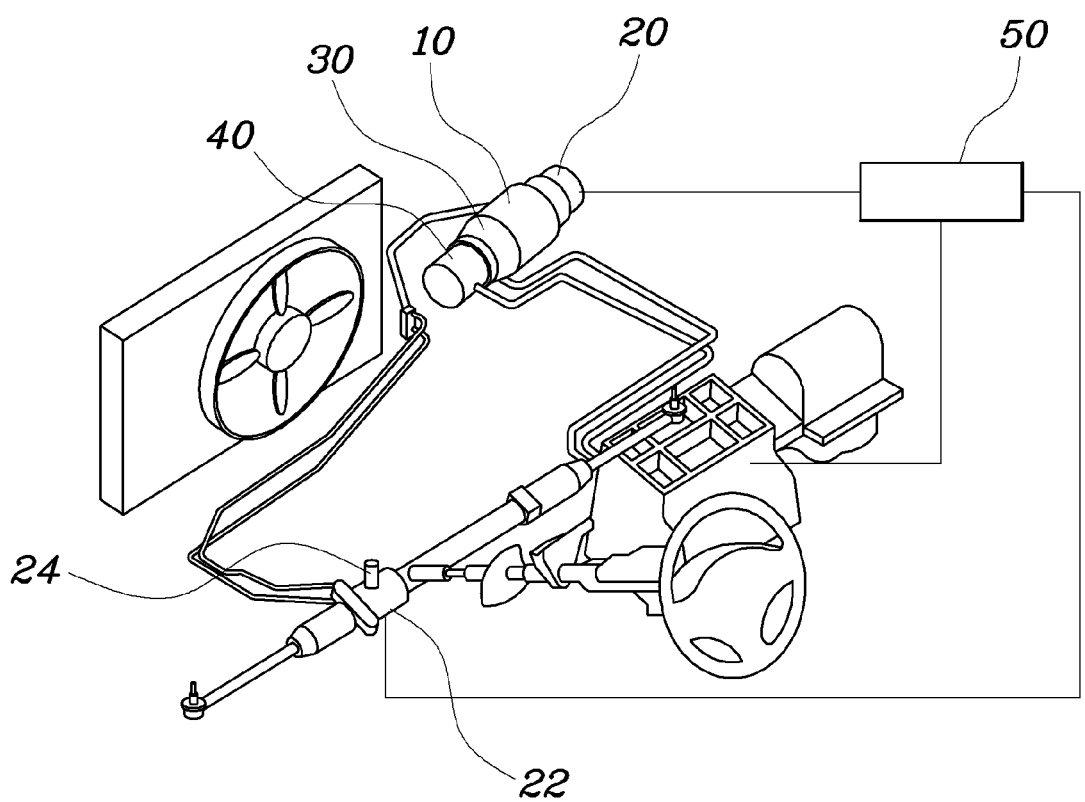
FIG. 1 is a view showing a configuration of an exemplary electric actuator-integrated electric power steering system according to the present invention.
Figure 2:
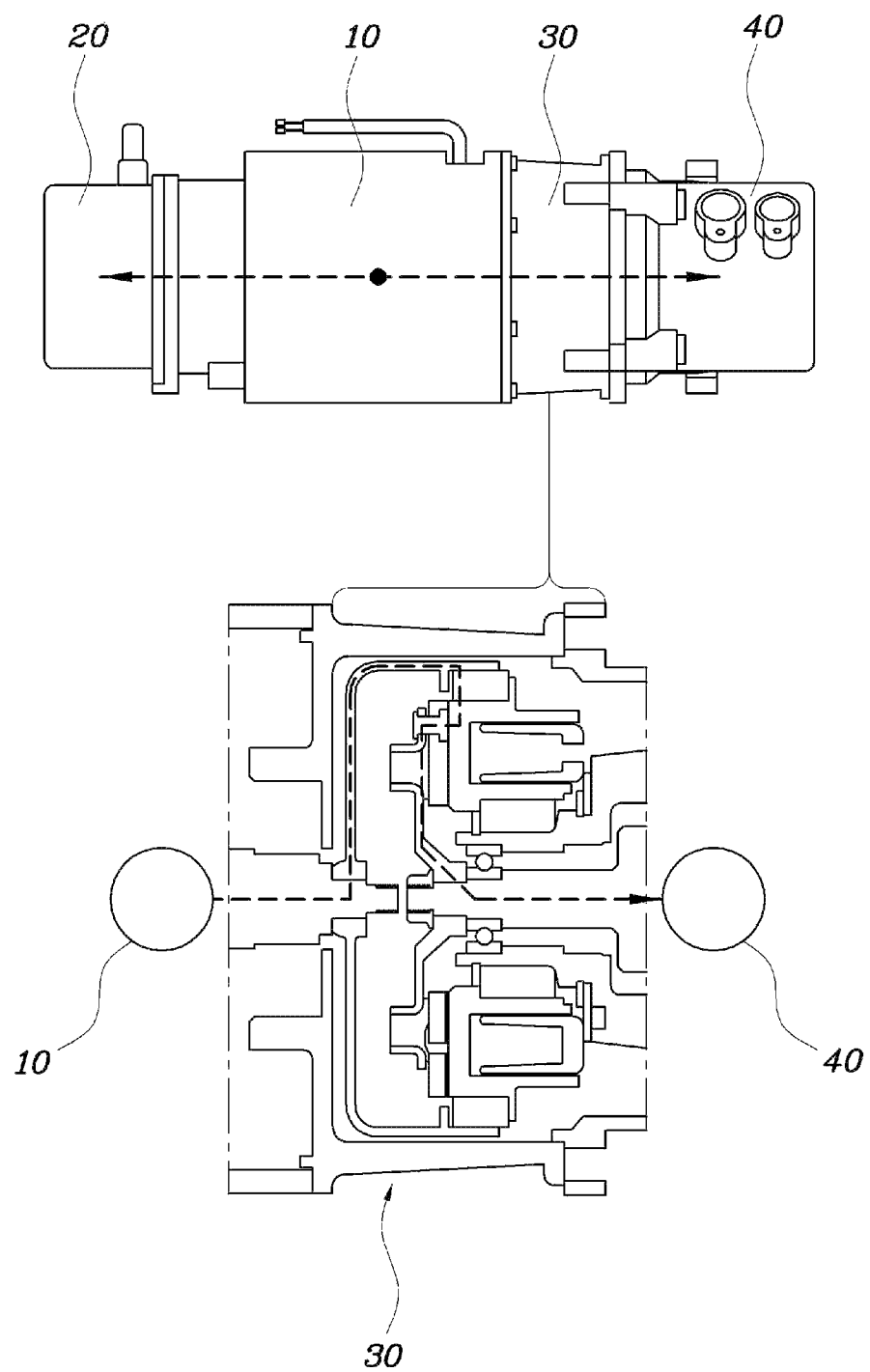
FIG. 2 is a view illustrating a power transmission flow carried out by a power transmitting means when an electric power steering system and an electric actuator operate in an integrated fashion according to the present invention.
Figure 3:
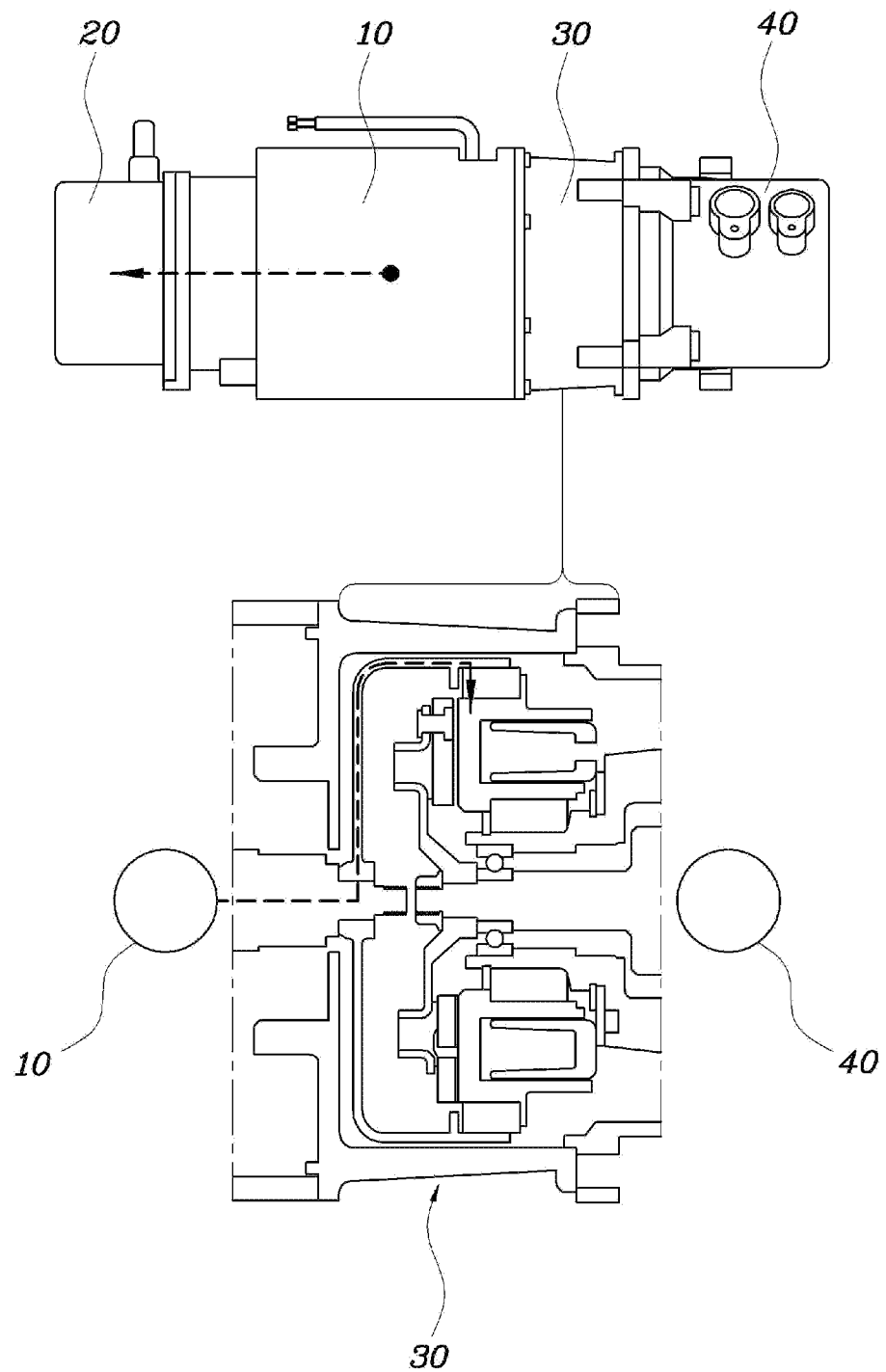
FIG. 3 is a view illustrating a power transmission flow carried out by a power transmitting means when an electric power steering system operates alone according to the present invention.

FIG. 1 is a view showing the overall configuration of an electric actuator-integrated electric power steering system according to various embodiments of the present invention, FIG. 2 is a view illustrating a power transmission flow carried out by a power transmitting means when an electric power steering system and an electric actuator 40 operate in an integrated fashion, and FIG. 3 is a view illustrating a power transmission flow carried out by a power transmitting means when an electric power steering system operates alone.

The electric actuator-integrated electric power steering system according to various embodiments generally includes an integrated motor 10, a hydraulic pump 20 and an electric actuator 40. The electric actuator-integrated electric power steering system according to various embodiments will be described in detail with reference to FIG. 1 to FIG. 3. The integrated motor 10 provides rotational force. The hydraulic pump 20 is connected to one end of the integrated motor 10. The hydraulic pump 20 is supplied with the rotational force from the integrated motor 10, and pumps working fluid that transmits steering force. The electric actuator 40 is connected to the other end of the integrated motor 10 via a power controlling means. Whether the rotational force from the integrated motor 10 is transmitted to or cut off from the electric actuator 40 depends on the operation of the power controlling means. The electric actuator 40 operates when the rotational force is transmitted to the electric actuator 40.

That is, the hydraulic pump 20 which provides steering force is disposed on one end of the integrated motor 10, and the electric actuator 40 which is driven by electricity is disposed on the other end of the integrated motor 10 such that the power controlling means is disposed between the integrated motor 10 and the electric actuator 40.

Therefore, the hydraulic pump 20 is driven by the rotational force supplied from the integrated motor 10. When the power controlling means operates, the rotational force from the integrated motor 10 is transmitted to the electric actuator 40 via the power controlling means, thereby actuating the electric actuator 40. This makes it possible to operate both the power steering system and the electric actuator 40 using one integrated motor 10, thereby reducing the manufacturing cost and the weight of a vehicle.

In addition, according to various embodiments, the hydraulic pump 20 can be connected to the integrated motor 10 in the state in which the rotational force from the integrated motor 10 is constantly supplied. That is, the pumping of the hydraulic pump 20 is enabled by the rotational force from the integrated motor 10 so as to assist the steering force of the steering wheel. It is preferred that the hydraulic pump 20 be disposed such that the hydraulic pump 20 can operate any time while the vehicle is being driven.

In addition, the power controlling means can be an electromagnetic clutch 30 which turns on/off depending on whether or not current is induced. That is, when current is induced to a coil that forms the electromagnet clutch 30, a disk which rotates together with the integrated motor 10 turns on through surface contact with a plate that is provided on a coil side, thereby causing the electric actuator 40 connected to the plate to operate and rotate.

In contrast, when no current is induced to the coil, the disk and the plate are detached from each other due to elasticity, and thereby are turned off, so that the electric actuator 40 connected to the plate does not operate.

The electromagnet clutch 30 may be one that is commonly used, and descriptions of the detailed structure and configuration will be omitted.

The electric actuator 40 can be implemented as an electric compressor which allows an air conditioner to operate. That is, the electric actuator 40 is an electric actuator which compresses refrigerant of the air conditioner. The electric actuator can be applied to an environmental vehicle in which no engine is mounted or which can run on a driving force from a motor instead of an engine.

The electric actuator-integrated electric power steering system according to various embodiments further includes a control valve 24 and a control part 50. The control valve 24 is disposed on a path along which the working fluid is supplied to a steering gear box 22, and controls the flow rate of the working fluid. The control part 50 is electrically connected to the motor and the control valve 24, receives an operation signal which allows the electric actuator 40 to operate, and variably controls the motor and the control valve 24 while causing the power controlling means to operate or not depending on the operation of the electric actuator 40.

That is, one control part 50 controls the operation of the electric-hydraulic power steering system and the electric compressor by controlling the integrated motor 10 and the control valve. Due to this integration by the control part 50, the weight and cost of the system are reduced.

Here, the control valve 24 can be a solenoid valve that can be controlled depending on the control over the output of current. The control valve 24 can control the flow rate of the working fluid that is pumped by the hydraulic pump 20 so as to enter the steering gear box 22.

In addition, the control part 50 determines the number of revolutions of the motor depending on the load of operation of the electric actuator 40 when the power controlling means operates. Here, the control part 50 can control the steering force by adjusting the flow rate of the working fluid.

That is, when an occupant operates the air conditioner, a signal which allows the electric compressor to operate is transmitted to the control part 50, and the control part 50 rotates the integrated motor 10 by determining the number of revolutions of the integrated motor 10 so as to satisfy the load of operation of the air conditioner.

However, if a high value of the load of operation of the air conditioner is input when the vehicle is running at a high speed, the integrated motor 10 rotates at a high speed in order to satisfy the load of operation of the air conditioner, and the amount of the working fluid that is pumped by the hydraulic pump 20 also increases, thereby leading to a problem in that the steering motion of the steering wheel at the high speed becomes fast.

Therefore, in order to overcome such a problem, the control valve 24 is controlled under the above-mentioned condition so that the amount of the working fluid that is supplied to the steering gear box 22 is suitably controlled. Consequently, optimum steering force can be supplied to the driver irrespective of the load of operation of the compressor and the number of revolutions of the motor.

In the meantime, the control part 50 can control the steering force by adjusting the flow rate of the working fluid by controlling the number of revolutions of the motor when the power controlling means does not operate.

When the air conditioner is not operated, the rotational force from the integrated motor 10 is used entirely for the operation of the hydraulic pump 20. Then, the control part 50 can provide the optimum steering force for the steering wheel by controlling the number of revolutions of the integrated motor 10.

Figure 4:
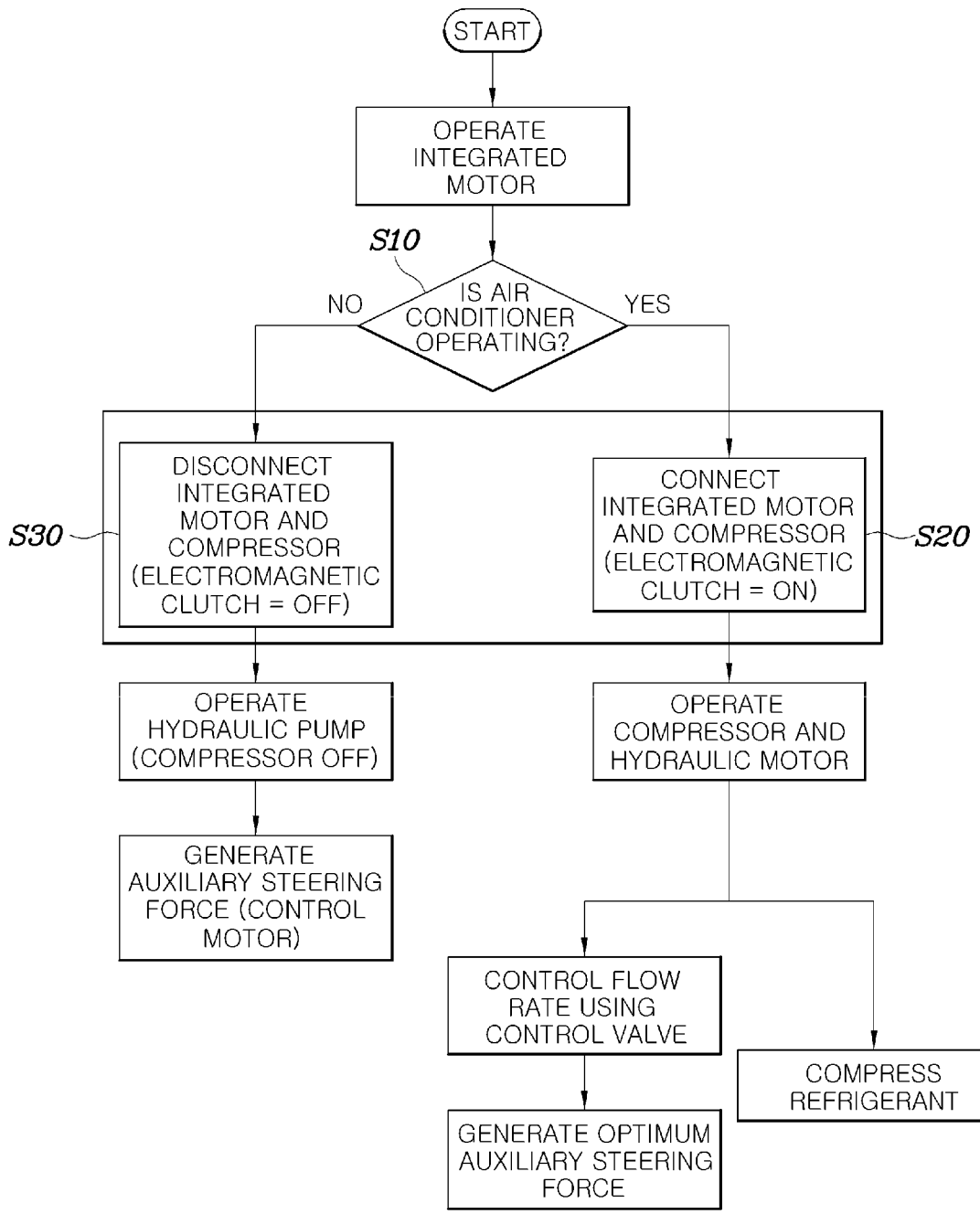
FIG. 4 is a flowchart illustrating a control flow of an electric actuator-integrated electric power steering system according to the present invention.

FIG. 4 is a flowchart illustrating a control flow of the electric power steering system in which the electric actuator 40 is integrated according to various embodiments of the present invention. Referring to FIG. 4, a method of controlling the electric actuator-integrated electric power steering system according to various embodiments includes: step S10 of detecting an operation signal that allows the air conditioner to operate; step S20 of operating the hydraulic pump 20 and the electric actuator 40 in an integrated fashion using the rotational force from the integrated motor 10 as the power controlling means operates when the air conditioner is operated; and step S30 of operating the hydraulic pump 20 alone using the rotational force from the integrated motor 10 as the power controlling means does not operate when the air conditioner is not operated.

At the step S20 of operating the hydraulic pump 20 and the electric actuator 40 in an integrated fashion, the number of revolutions of the motor is determined depending on the load of operation of the compressor, in which it is possible to control the steering force by adjusting the flow rate of the working fluid through the control valve 24.

At the step S30 of operating the hydraulic pump 20 alone, it is possible to control the steering force by adjusting the flow rate of the working fluid by controlling the number of revolutions of the motor.

Referring to the above-mentioned control flow in conjunction with FIG. 4, when the vehicle is started, the integrated motor 10 is enabled to operate, and the control part 50 detects whether or not the air conditioner is being operated.

First, if a steering motion of the steering wheel is detected in the state in which the air conditioner is not operated, the electric clutch 30 remains in an off state. Thus, the integrated motor 10 is operated to rotate such that only the hydraulic pump 20 operates. Consequently, optimum steering force can be provided to the steering wheel.

In contrast, when the air conditioner is operated, the electromagnetic clutch 30 is turned on and the compressor is operated due to the rotational force from the integrated motor 10. This consequently compresses refrigerant, thereby supplying cool air into the cabin.

In addition, if the steering motion of the steering wheel is detected in the state in which the compressor is operated, the hydraulic pump 20 is also operated by the rotational force of the integrated motor 10. At this time, the flow rate of the working fluid pumped by the hydraulic pump 20 can be suitably controlled through the control valve 20 in order to provide optimum steering force.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An electric actuator-integrated electric power steering system comprising:
   an integrated motor which provides rotational force;
   a hydraulic pump connected to one end of the integrated motor, wherein the hydraulic pump is supplied with the rotational force from the integrated motor to pump working fluid that is used to transmit steering force; and an electric actuator connected to the other end of the integrated motor via a power controlling means, wherein the electric actuator operates when the rotational force is transmitted to the electric actuator and whether the rotational force from the integrated motor is transmitted to or cut off from the electric actuator depends on an operation of the power controlling means.

2. The electric actuator-integrated electric power steering system according to claim 1, wherein the hydraulic pump is connected to the integrated motor such that the rotational force from the integrated motor is continuously supplied to the hydraulic pump.

3. The electric actuator-integrated electric power steering system according to claim 1, wherein the power controlling means comprises an electromagnetic clutch which turns on/off depending on whether or not a current is induced.

4. The electric actuator-integrated electric power steering system according to claim 1, wherein the electric actuator comprises an electric compressor which allows an air conditioner to operate.

5. The electric actuator-integrated electric power steering system according to claim 1, further comprising:
a control valve disposed on a path along which the working fluid is supplied to a steering gear box, wherein the control valve controls a flow rate of the working fluid; and
a control part electrically connected to the motor and the control valve, wherein the control part receives an operation signal which allows the electric actuator to operate, and variably controls the motor and the control valve while causing the power controlling means to operate or not depending on an operation of the electric actuator.

6. The electric actuator-integrated electric power steering system according to claim 5, wherein the control part determines a number of revolutions of the motor depending on a load of the operation of the electric actuator when the power controlling means operates, and controls the steering force by adjusting the flow rate of the working fluid through the control valve.

7. The electric actuator-integrated electric power steering system according to claim 5, wherein the control part controls the steering force by adjusting the flow rate of the working fluid by controlling a number of revolutions of the motor when the power controlling means does not operate.

8. A method of controlling the electric actuator-integrated electric power steering system cited in claim 1, comprising:
detecting whether or not there is an operation signal which allows an air conditioner to operate;
operating the hydraulic pump and the electric actuator in an integrated fashion using the rotational force from the integrated motor as the power controlling means operates when the air conditioner is operated; and
operating the hydraulic pump alone using the rotational force from the integrated motor as the power controlling means does not operate when the air conditioner is not operated.

9. The method according to claim 8, wherein the operating of the hydraulic pump and the electric actuator in the integrated fashion comprises:
determining a number of revolutions of the motor depending on a load of an operation of the electric actuator, wherein the steering force is controlled by adjusting a flow rate of the working fluid through a control valve.

10. The method according to claim 8, wherein the operating of the hydraulic pump alone comprises:
controlling the steering force by adjusting a flow rate of the working fluid by controlling a number of revolutions of the motor.

11. An electric actuator-integrated electric power steering system comprising:
an integrated motor which provides rotational force;
a hydraulic pump connected to one end of the integrated motor, wherein the hydraulic pump is supplied with the rotational force from the integrated motor to pump working fluid that is used to transmit steering force; and
a compressor connected to the other end of the integrated motor via a power controlling means, wherein the compressor operates when the rotational force is transmitted to the compressor, and whether the rotational force from the integrated motor is transmitted to or cut off from the compressor depends on an operation of the power controlling means.

12. A method of controlling the electric actuator-integrated electric power steering system cited in claim 11, comprising:
detecting whether or not there is an operation signal which allows an air conditioner to operate;
operating the hydraulic pump and the compressor in an integrated fashion using the rotational force from the integrated motor as the power controlling means operates when the air conditioner is operated; and
operating the hydraulic pump alone using the rotational force from the integrated motor as the power controlling means does not operate when the air conditioner is not operated.

13. The method according to claim 12, wherein the operating of the hydraulic pump and the compressor in the integrated fashion comprises:
determining a number of revolutions of the motor depending on a load of an operation of the compressor, wherein the steering force is controlled by adjusting a flow rate of the working fluid through a control valve.

14. The method according to claim 12, wherein the operating of the hydraulic pump alone comprises:
controlling the steering force by adjusting a flow rate of the working fluid by controlling a number of revolutions of the motor.

* * * * *